United States Patent
Li et al.

(10) Patent No.: US 9,577,502 B2
(45) Date of Patent: Feb. 21, 2017

(54) TRANSVERSE FLUX PERMANENT MAGNET ROTATORY DEVICE

(71) Applicant: Johnson Electric S.A., Murten (CH)

(72) Inventors: Yue Li, Hong Kong (CN); Jinyun Gan, Hong Kong (CN); Chuiyou Zhou, Hong Kong (CN); Yanfei Liao, Shenzhen (CN); Xiaomei Yuan, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 767 days.

(21) Appl. No.: 14/020,171

(22) Filed: Sep. 6, 2013

(65) Prior Publication Data

US 2014/0062242 A1    Mar. 6, 2014

(30) Foreign Application Priority Data

Sep. 6, 2012 (CN) .......................... 2012 1 0327583

(51) Int. Cl.
*H02K 21/38* (2006.01)
*H02K 21/22* (2006.01)

(52) U.S. Cl.
CPC ............ *H02K 21/38* (2013.01); *H02K 21/227* (2013.01); *H02K 2201/12* (2013.01)

(58) Field of Classification Search
CPC ........................ H02K 2201/12; H02K 2201/18
USPC .................. 310/268, 156.53, 156.84, 156.02
See application file for complete search history.

(56) References Cited

U.S. PATENT DOCUMENTS

| 5,051,641 | A | 9/1991 | Weh |
| 5,684,352 | A * | 11/1997 | Mita ........................ H02K 1/02 310/152 |
| 7,466,058 | B2 | 12/2008 | Dubois et al. |
| 2006/0244335 | A1 | 11/2006 | Miyazaki et al. |
| 2007/0145850 | A1 * | 6/2007 | Hsu ...................... H02K 1/2766 310/156.56 |
| 2007/0228860 | A1 * | 10/2007 | Rao .......................... H02K 1/12 310/156.37 |
| 2009/0322165 | A1 * | 12/2009 | Rittenhouse ......... H02K 1/2786 310/43 |

(Continued)

OTHER PUBLICATIONS

J. S. D. Garcia, "Transverse Flux Machines: What for?", IEEE Multidiscipliananry Engineering Education Magazine, vol. 2, No. 1, Mar. 2007.

(Continued)

*Primary Examiner* — Terrance Kenerly
(74) *Attorney, Agent, or Firm* — Muncy, Geissler, Olds & Lowe, P.C.

(57) ABSTRACT

A transverse flux motor (10) includes a housing (20), a stator (50), and a rotor (30) external to the stator (50) and installed onto the housing. The stator (50) includes a stator subassembly including at least one pair of stator core elements (52), each having multiple stator pole teeth (56) circumferentially offset from pole teeth of the other stator core element in the pair. The rotor (30) includes a rotor body (32) made of a single piece part or multiple rotor body laminas (36). The rotor body (32) includes multiple magnetic flux retention features (40) for positioning first magnets (34). Two adjacent magnetic flux retention features (48) define a second magnet retention feature (47) for positioning a second magnet (45) that form a substantially U-shape together with two neighboring first magnets with the same magnetic poles facing each other.

17 Claims, 9 Drawing Sheets

(56) References Cited

U.S. PATENT DOCUMENTS

2012/0119599 A1* 5/2012 Calley .................. B62M 6/65
310/44

OTHER PUBLICATIONS

Basics of Design Engineering Motion Control, Machine Design, Penton Media, Inc., Jun. 1, 2000.

* cited by examiner

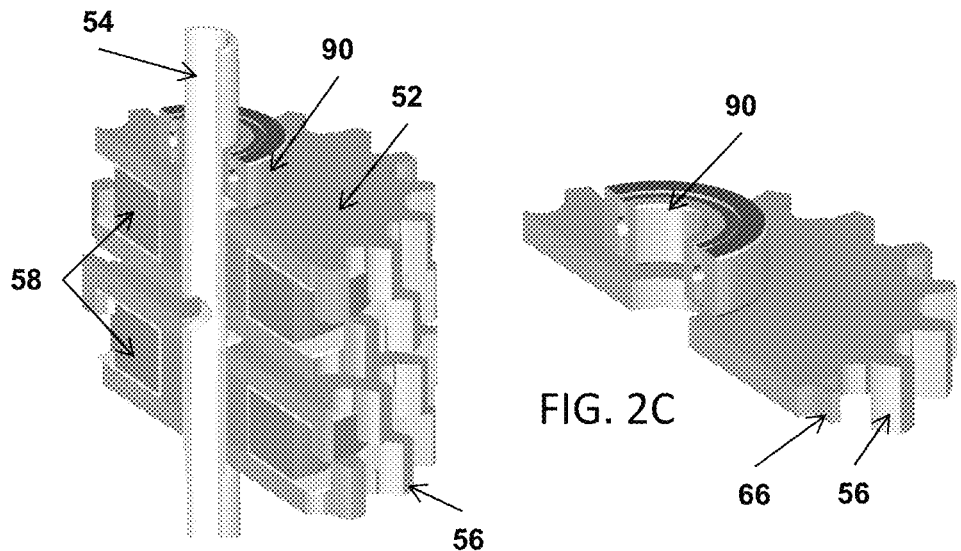
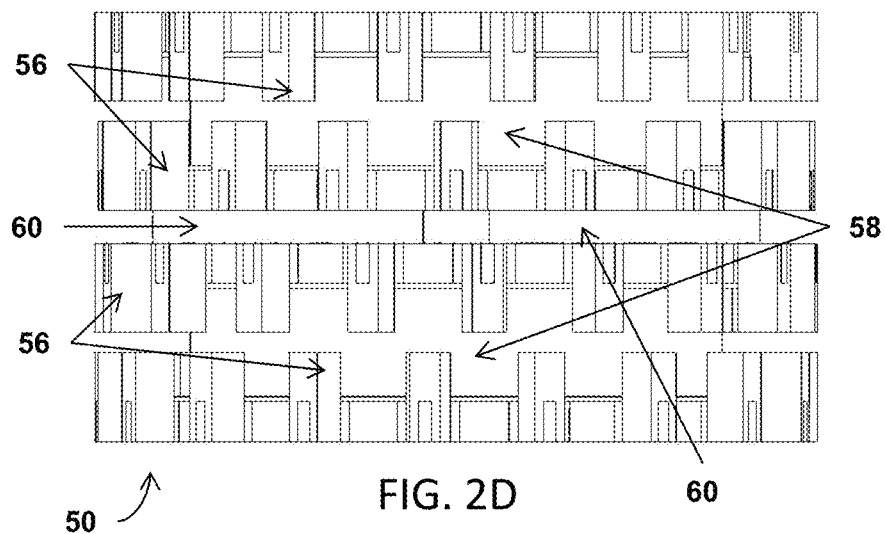

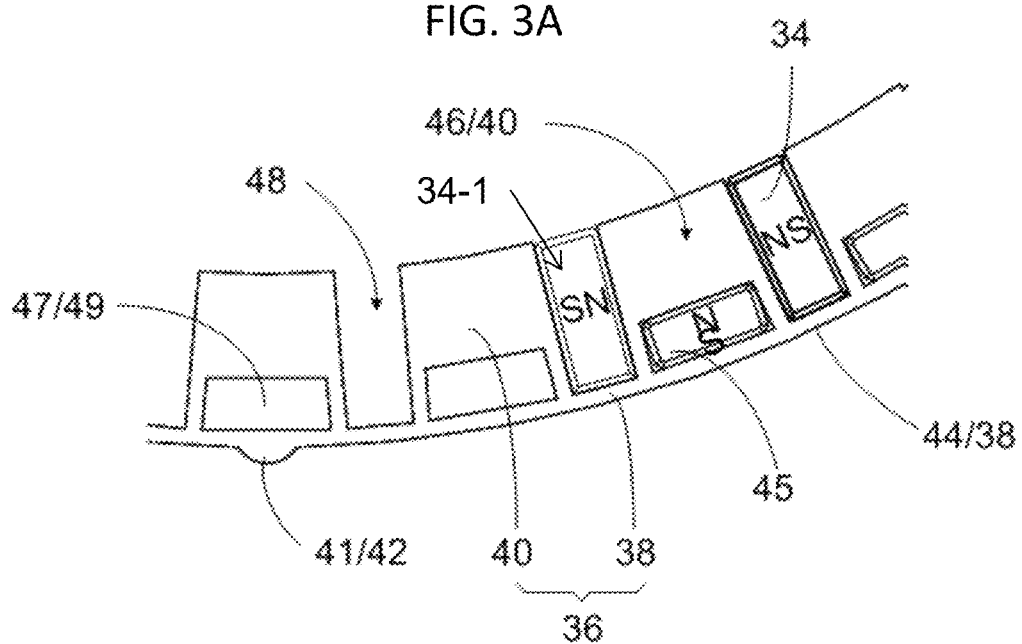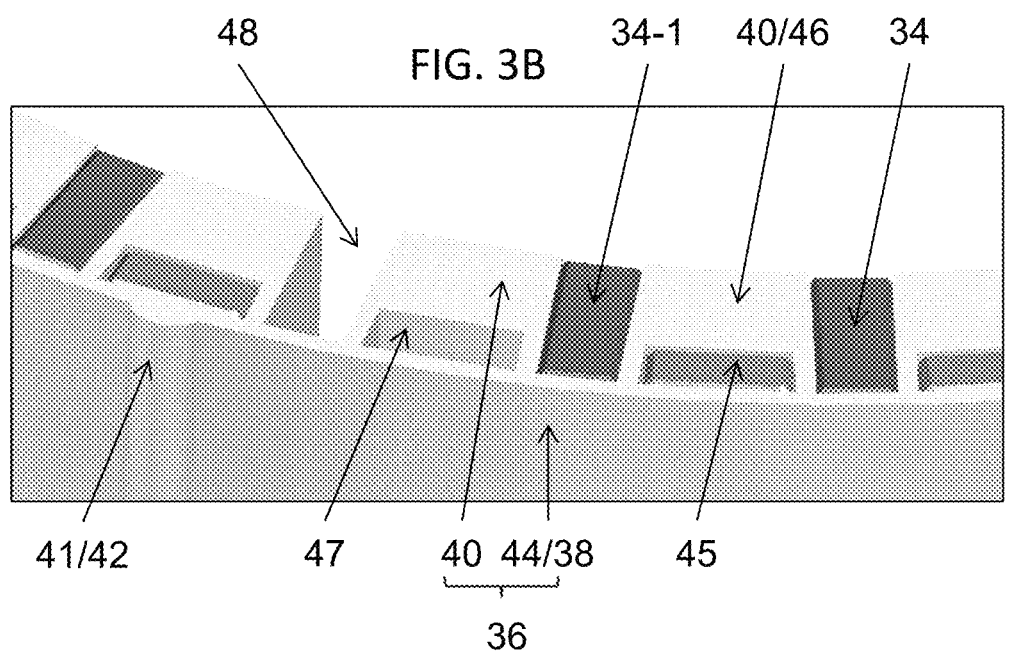

US 9,577,502 B2

TRANSVERSE FLUX PERMANENT MAGNET ROTATORY DEVICE

CROSS REFERENCE TO RELATED APPLICATION(S)

This application claims the benefit of Chinese patent application serial no. 201210327583.X having a filing date of Sep. 6, 2012. The entire content of the aforementioned patent applications is hereby incorporated by reference for all purposes.

BACKGROUND

A typical transverse flux motor (TFM) is a type of brushless electric motor and, when compared to a radial flux motor, may provide higher torque and efficiency at lower speeds. A transverse flux motor typically includes a stator and a rotor that substantially surrounds the stator. The stator may include one or more filed windings that are commutated to produce rotating magnetic fluxes to drive the rotor. The magnetic field inside a transverse flux motor is three-dimensional in nature and thus usually requires complex numerical simulation techniques (e.g., finite element analysis) to predict or estimate the magnetic field distribution.

A conventional transverse flux motor has a housing that includes multiple magnetic flux concentrators extending radially toward the center of the housing. Corresponding to each magnetic flux concentrator, there are two rotor permanent magnets attached the interior wall of the housing along the circumference direction. The magnetic flux concentrators typically have the form of a rod or bar and are attached to the interior wall of the housing by, for example, using adhesives or mechanical fastening techniques or other similar manufacturing processes for joining two components. The rotor permanent magnets are also usually attached to the interior wall of the housing using similar manufacturing processes. The positioning of the magnetic flux concentrators or the rotor permanent magnets usually exhibits larger variations or tolerances in conventional transverse flux motors due to the larger tolerances associated with such manufacturing processes. As a result, the efficiency of conventional TFMs is typically lower than desired and thus runs contrary to the intended purposes for achieving higher efficiencies of using transverse flux motors.

Therefore, there exists a need for a transverse flux motor that includes multiple magnetic flux retention features in the rotor and multiple magnets in both the rotor and the stator, while providing the desired or required positioning precision for the rotor, the stator, or various magnets in the stator or the rotor.

SUMMARY OF THE INVENTION

Various embodiments are directed at a transverse flux motor that include a stator and a rotor external to the stator. The stator includes one or more stator sub-assemblies, each of which includes one or more pairs of stator core elements. A stator core element includes a stator core body and multiple stator pole teeth that may integrally formed or separately attached to the stator core element body. The stator pole teeth on each pair of stator core elements are manufactured or assembled in such a way to point to opposite directions so as to narrow down the gap between the stator core elements in the pair or to improve the uniformity of magnetic field distribution or coupling. The stator pole teeth on a stator core element may be offset from the stator pole teeth of an immediately neighboring stator core element in a circumferential direction by one or more electrical angles to reduce torque ripple, cogging torque, vibration, or electromagnetic interferences arising therefrom. Cogging torque in dc brushless motors comes from variations in magnetic field density around a rotor's permanent magnets as they pass the non-uniform geometry of the slot openings in the stator.

A stator core element may comprise one or more materials that exhibit the desired magnetic susceptibility or magnetic permeability. Some embodiments may include one or more diamagnetic materials for the stator core elements. A stator sub-assembly may also include field coils or field windings between a pair of stator core elements to carry electric current in the circumferential direction of the stator sub-assembly. A stator may also include a shaft aligned substantially with the center axis of the one or more stator core sub-assemblies in some embodiments where the shaft may be mounted to a frame or any non-moving part of a vehicle. The transverse flux motor may further include one or more components each having a bearing surface to interface the shaft with the housing of the transverse flux motor.

A stator core sub-assembly may also include a bushing to interface with a shaft of the stator or to establish a proper spacing between two stator core elements in the stator sub-assembly. The field coils or field windings may be wound around the bushing to simplify the manufacturing process for winding the field coils or field windings. In some embodiments where the stator includes multiple stator sub-assemblies, the stator may further include a spacer element between two immediately neighboring stator sub-assemblies. The spacer element may comprise a single piece component or multiple pieces. A spacer element may include one or more light-weight materials such as plastics or polymers in some embodiments. A spacer element may include one or more materials that have low magnetic permeability or low magnetic permeability constant to reduce electromagnetic interferences between the two immediately neighboring stator sub-assemblies in some embodiments.

The rotor includes a rotor body that may be an integrally manufactured single piece component or may include multiple substantially laminas jointly forming the rotor body. The rotor may also include a housing that includes one or more positioning features for assembling the rotor body into the housing with desired or required positioning precision. The rotor body may further include multiple magnetic flux retention features that are substantially equally distributed along a circumference of the rotor body while leaving and defining the space between two adjacent magnetic flux retention features as a first magnet retention feature that may be used to install a first magnet to the rotor body. In these embodiments, these multiple magnetic flux retention features are an integral part of a rotor body and are not separately installed onto the housing of the transverse flux motor.

A magnetic flux retention feature may include therein a second magnet retention feature that may be used to install a second magnet to the rotor body. Each of the magnetic flux retention feature, the first magnet retention feature, and the second magnet retention feature may be manufactured to the desired or required tolerances. In some embodiments, a first magnet has its magnetic moment in substantially the circumferential direction of the rotor body, or in a direction that is substantially tangential to a circumference of the rotor body. In some embodiments, two adjacent first magnets are installed in a rotor body with the same polarity (e.g., north pole or south pole) closer to or substantially facing each other. In these embodiments, at least a part of the second magnet retention feature is located between the two adjacent first magnet retention features to receive a second magnet.

A second magnet has a magnetic moment in substantially the radial direction of the rotor body to which the second magnet is installed, where the second magnet is installed with the same polarity as that of the ends of the two immediately neighboring first magnets closer to or facing each other. The second magnet and its two immediately neighboring first magnets form a substantially U-shape, although the three magnets are not physically connected to each other, and the two first magnets may or may not necessarily be parallel to each other. A rotor body may also include one or more protruded or embossed feature for positioning the rotor body to the one or more corresponding features in the housing of the transverse flux motor with desired or required precision. The housing may further define one or more patterns that may be used to attach the housing to, for example, one or more driving wheels or a transmission mechanism of a vehicle such that the rotor transfers its output to the one or more wheels or the transmission mechanism and hence drive the vehicle by the rotation or spinning of the transverse flux motor.

In some embodiments, a rotor body includes multiple rotor body laminas that jointly form the rotor body. Each rotor body lamina of the multiple rotor body laminas includes corresponding features that, when these multiple rotor body laminas stack on top of each other to form the rotor body, jointly define the features such as the magnetic flux retention features, the first magnet retention features, the second magnet retention features, and the one or more protruded or embossed features on the rotor body. It shall be noted that although various embodiments described herein are directed at an electric motor or a transverse flux motor, various features may also be incorporated in other energy conversion rotary devices such as an electricity generator. Therefore, the recitation of a transverse flux motor is not intended to limit the scope of the claims or the scope of other implementations only to a transverse flux motor excluding other types of electric motors, and the recitation of a motor or a transverse flux motor is not intended to limit the scope of the claims or the scope of other implementations only to a motor excluding other types of energy conversion rotary devices, unless such an exclusion is otherwise specifically recited or claimed.

More details about the improved rotary device are described in the Detailed Description section with reference to FIGS. 1-7 as provided below.

BRIEF DESCRIPTION OF THE FIGURES

The drawings illustrate the design and utility of embodiments, in which similar elements are referred to by common reference numerals. These drawings are not necessarily drawn to scale. In order to better appreciate how the above-recited and other advantages and objects may be obtained, a more particular description of the embodiments will be rendered which are illustrated in the accompanying drawings. These drawings depict only exemplary embodiments and are not therefore to be considered limiting of the scope of the claims.

FIGS. 2A-E illustrate perspective views of more details of the exemplary permanent magnet rotatory device in some embodiments.

FIGS. 3A-B illustrate more details about the rotor 30 of the exemplary rotatory device 10 illustrated in FIGS. 1 and 2A-E in some embodiments.

DETAILED DESCRIPTION

Figure 1:
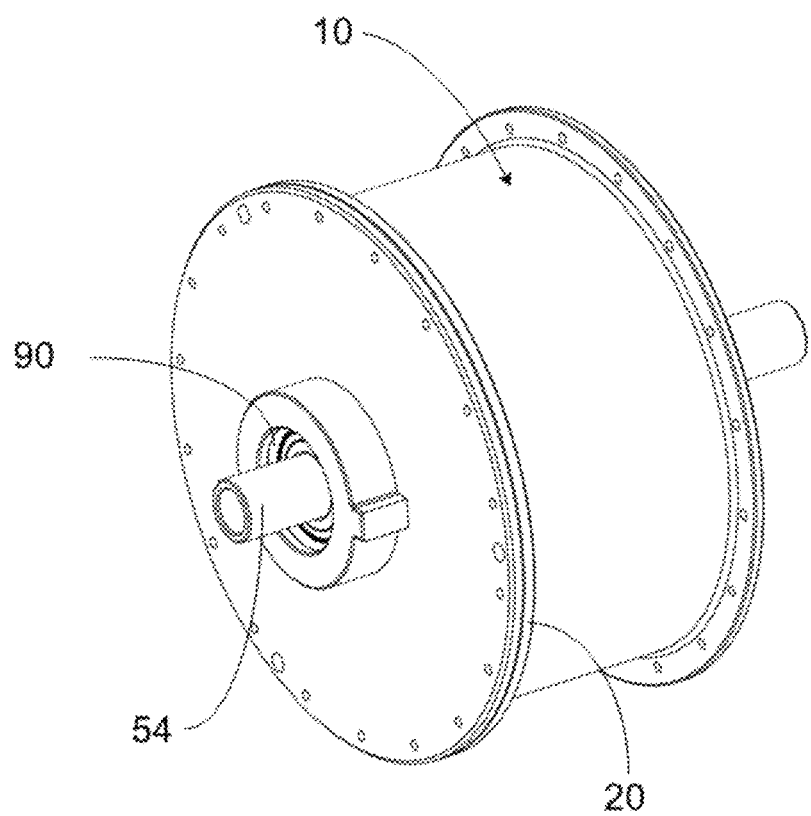
FIG. 1 illustrates a perspective view of the exterior of an exemplary permanent magnet rotatory device in some embodiments.

Various features are described hereinafter with reference to the figures. It shall be noted that the figures are not necessarily drawn to scale, and that the elements of similar structures or functions are represented by like reference numerals throughout the figures. It shall also be noted that the figures are only intended to facilitate the description of the features for illustration and explanation purposes, unless otherwise specifically recited in one or more specific embodiments or claimed in one or more specific claims. The drawings figures and various embodiments described herein are not intended as an exhaustive illustration or description of various other embodiments or as a limitation on the scope of the claims or the scope of some other embodiments that are apparent to one of ordinary skills in the art in view of the embodiments described in the Application. In addition, an illustrated embodiment need not have all the aspects or advantages shown.

Some first embodiments are directed at a rotatory device that comprises a housing for the rotatory device, a stator comprising a first stator sub-assembly including a first stator core element having a first plurality of stator pole teeth and a second stator core element adjacent to the first stator core element in an axial direction and having a second plurality of stator pole teeth circumferentially offset form the first plurality of stator pole teeth, and a rotor surrounding the stator and comprising a rotor body attached to an interior wall of the housing, including a plurality of rotor body laminas laminated along a axial direction, and having a plurality of magnetic flux retention features extending radially toward the stator and a plurality of first permanent magnets disposed between adjacent pairs of the plurality of magnetic flux retention features of the rotor body.

In these first embodiments, the housing further comprises a first positioning feature on the interior wall, and the rotor body further comprises a second positioning feature that mates with the first positioning feature. In some of the first embodiments, the first stator core element further comprises a plurality of protrusions, and the plurality of first stator pole teeth of the first stator core element are disposed on the plurality of protrusions. In addition or in the alternative, the housing further comprises a first mounting pattern to attach the housing to a moving part of an external device, and the stator further comprises a shaft to attach the stator to an immobile part of the external device in some of the first embodiments. In some of the first embodiments, the first stator sub-assembly further comprising a first field winding disposed between the first stator core element and the second stator core element.

The stator in some of the first embodiments may further comprise a second stator sub-assembly adjacent to the first stator sub-assembly in a axial direction and including a third stator core element having a third plurality of stator pole teeth offset circumferentially from the second plurality of stator pole teeth, and a fourth stator core element having a fourth plurality of stator pole teeth circumferentially offset from the third plurality of stator pole teeth. In some of the immediately preceding embodiments, the stator further comprising a spacer element disposed between the first stator sub-assembly and the second stator sub-assembly. In some of the first embodiments, the rotor body further includes a plurality of apertures, adjacent to the plurality of magnetic flux retention features, and the rotor further includes a plurality of second magnets disposed in the plurality of apertures in the rotor body.

In some of the immediately preceding embodiments, the plurality of first magnets have first orientation of magnetic moments substantially tangential to circumferential directions of the rotor body, and the plurality of second magnets have second orientation of magnetic moments substantially aligned in radial directions of the rotor body. In some of the immediately preceding embodiments, a pair of the plurality of first magnets adjacent to each other have a same magnetic pole facing each other, and one the plurality of second magnets adjacent to the pair of the plurality of the first magnets has a magnetic pole identical to the same magnetic pole of the pair of the first magnets facing each other.

Some second embodiments are directed at a transverse flux motor comprising a housing, a stator, and a rotor surrounding the stator. In these embodiments, the stator comprises a shaft, and a first stator sub-assembly attached to said shaft and having a first plurality of stator pole teeth arranged in a first circle and a second plurality of stator pole teeth arrange in a second circle and circumferentially offset from the first plurality of stator pole teeth. In addition, the rotor surrounding the stator comprises a rotor body attached to an interior wall of the housing and having a plurality of magnetic flux retention features extending radially toward the stator and a plurality of apertures on the plurality of magnetic flux retention features adjacent to said housing, a plurality of first permanent magnets disposed between adjacent pairs of the plurality of magnetic flux retention features of the rotor body, and a plurality of second permanent magnets disposed in the plurality of apertures.

In some of the second embodiments, said first stator sub-assembly further comprises a plurality of first protrusions and a plurality of second protrusions, and the plurality of first stator pole teeth and the plurality of the second stator pole teeth are disposed on the plurality of first protrusions and the plurality of second protrusions, respectively. In some of the second embodiments, the first stator sub-assembly further comprises a first field winding disposed between the first circle of the plurality of the first stator pole teeth and the second circle of the plurality of the second stator pole teeth. In addition or in the alternative, the stator may further comprise a second stator sub-assembly adjacent to said first stator sub-assembly in an axial direction and including a third plurality of stator pole teeth arranged in a third circle parallel to the second circle and offset circumferentially from the second plurality of stator pole teeth, and a fourth plurality of stator pole teeth circumferentially arranged in a fourth circle adjacent to the third circle and offset circumferentially from the third plurality of stator pole teeth. In some of the immediately preceding embodiments, the stator further comprising a spacer disposed between said first stator sub-assembly and said second stator sub-assembly. In addition or in the alternative, the second plurality of second stator pole teeth are offset from the first plurality of stator pole teeth in a predetermined circumferential direction by a predetermined angle; on said first stator sub-assembly, and the fourth plurality of stator pole teeth are offset from the third plurality of stator pole teeth in the predetermined circumferential direction by the predetermined angle on said second stator sub-assembly in some embodiments. In some of the immediately preceding embodiments, the third plurality of stator pole teeth on said second stator sub-assembly are offset from the second plurality of stator pole teeth on said first stator sub-assembly in the predetermined circumferential direction by the predetermined angle.

In some of the second embodiments, the rotor body includes a plurality of rotor body laminas laminated together along an axial direction. In some of the second embodiments, the plurality of first magnets have first orientation of magnetic moments substantially tangential to circumferential directions of said rotor body, and the plurality of second magnets have second orientation of magnetic moments substantially aligned in radial directions of said rotor body. In some of the immediately preceding embodiments, a pair of the plurality of first magnets adjacent each other have identical magnetic poles facing each other, and one the plurality of second magnets adjacent the pair of the plurality of the first magnets has a magnetic pole identical to the identical magnetic poles of the pair of the first magnets facing each other.

Some alternative first embodiments are directed at a method for driving a vehicle with a transverse flux motor, where the method may comprise an act of identifying a transverse flux motor having a housing, a shaft, a stator, and a rotor external to the stator, an act of identifying a first mounting feature on the housing, an act of attaching the housing of the transverse flux motor to a driving part of the vehicle by using the first mounting pattern on the housing, and an act of attaching the shaft of the transverse flux motor to an immobile part of the vehicle. In these embodiments, the rotor comprises a rotor body and is attached to the housing to separate multiple magnetic flux retention features on the rotor body from the housing. In some of these alternative first embodiments, the method may further comprise an act of determining a first electrical angle for the stator; and an act of reducing an effect caused by torque fluctuations by circumferentially offsetting first multiple stator pole teeth on a first stator core element from second multiple stator pole teeth on a second stator core element of the stator with the first electrical angle.

In addition or in the alternative, the method may further comprise an act of determining a second electrical angle for the stator; and an act of reducing an effect caused by torque fluctuations by circumferentially offsetting first multiple stator pole teeth on a first stator sub-assembly from second multiple stator pole teeth on a second stator sub-assembly of the stator with the second electrical angle in some of these alternative first embodiments. In some of these alternative first embodiments, the method may further comprise an act of identifying one or more first positioning features on the housing of the transverse flux motor, an act of identifying one or more second positioning features on the rotor, and an act of improving a performance characteristic of the transverse flux motor by matching the first positioning features on the housing to the one or more second positioning features on the rotor to position the multiple magnetic flux retention features on the rotor body. In some of the immediately preceding embodiments, the performance characteristic of the transverse flux motor comprises an efficiency of the transverse flux motor, and the effect caused by torque fluctuations includes one or more of vibration, electromagnetic interference, cogging torque, and torque ripple.

FIG. 1 illustrates a perspective view of the exterior of an exemplary permanent magnet rotatory device in some embodiments. FIGS. 2A-E illustrate perspective views of more details of the exemplary permanent magnet rotatory device in some embodiments. In these embodiments, the exemplary permanent magnet rotatory device 10 comprises a shaft 54, a housing 20, a rotor 30 disposed on the inside of the substantially cylindrical housing 20, a stator 50 at least of part of which is enclosed within the rotor 30. In some of these embodiments, the rotor 30 may be attached to the interior wall of the housing 20.

It shall be noted that the housing 20 in FIG. 1 includes a substantially cylindrical shape. Nonetheless, the housing 20 of the exemplary permanent magnet rotatory device 10 may comprise other shapes as the designs or applications require or desire. In some of these embodiments illustrated in FIGS. 1 and 2A-E, housing 20 may further includes a first cover 24 and a second cover 26. In some of the embodiments illustrated in FIG. 2A, the first cover 24 may include a separable or inseparable protrusion 2501 having an aperture 21 that may be used to attach the exemplary permanent magnet rotatory device 10 to other applications. At least one cover of the first cover 24 or the second cover 26 may including one or more positioning features to position the at least one cover to the housing 20 or to position the rotor 30 to the housing 20, with desired or required precision or tolerances.

Figure 2A:
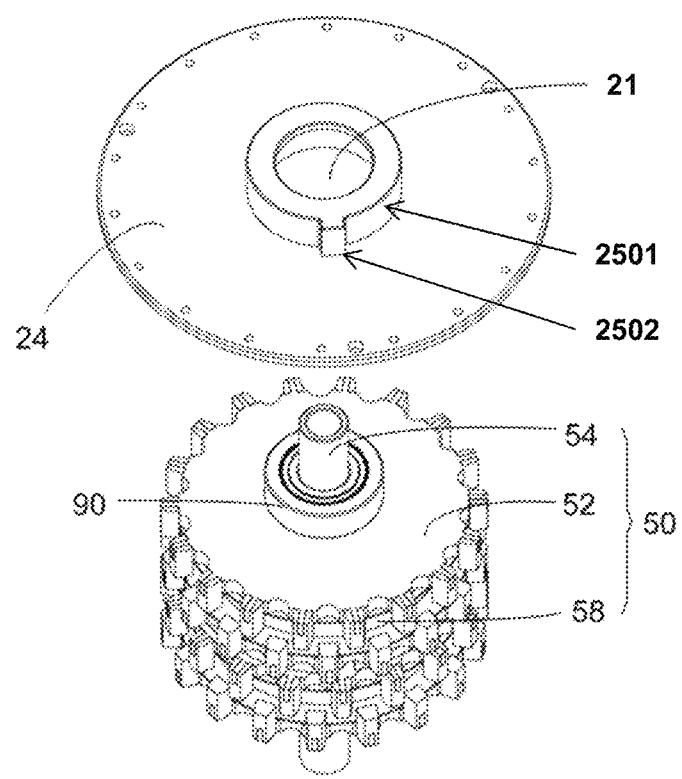

As illustrated in FIG. 2A, the separable or inseparable protrusion 2501 may comprise a annular ring-like structural member that may be separably attached to the first cover 24 (e.g., by using fasteners or built-in fastening features, etc.) in some embodiments or inseparably formed (e.g., via gluing, machining, welding, brazing, or any other manufacturing processes joining two pieces of materials together) on the first cover 24 in some other embodiments. The protrusion 2501 may also include a keying feature 2502 to ensure a proper orientation between the protrusion 2501 and hence the exemplary rotatory device 10 and an interfacing device in some embodiments. The keying feature 2502 may comprise a cutout into the protrusion 2501 or another protrusion out of the protrusion 2501 in some embodiments.

The shaft 54 of the exemplary rotatory device 10 may be coupled with the protrusion 2501 by using a bearing 90 in some of these embodiments. In some other embodiments, a sleeve, a bushing, or any other devices or components providing a bearing surface may also be used to couple the shaft 54 with the protrusion 2501. In some embodiments, the first cover 24 may further include one or more apertures (e.g., identical or different threaded or through holes, through holes with threaded inserts, counter-bores, countersinks, etc.), some of which may be used not only to attach the first cover 24 to the housing 20 but also to attach the exemplary permanent magnet rotatory device 10 to another application or vice versa. In some of these embodiments illustrated in FIG. 2A, the stator 50 includes the shaft 54 and two stator sub-assemblies.

Each stator sub-assembly includes two stator core elements (52), a bushing, bearing, or sleeve, etc. 55 (see FIG. 4 and collectively referred to as "bushing" hereinafter) in some embodiments. In some of these embodiments, the bushing 55 is fixedly attached to the shaft 54 by any suitable means so as to attach a stator core element 52 to the shaft 54. A stator core element (52) may further include multiple stator pole teeth 56 (see FIG. 2B) in some embodiments. In some of these embodiments, the number of stator pole teeth 56 may be determined based at least in part upon, for example but not limited to, the torque requirements of the transverse flux motor (TFM), the periodicity per revolution of the torque requirements, the operational speeds of the transverse flux motor, etc.

In some of these embodiments illustrated in FIGS. 2A-E, each stator sub-assembly may include a field winding 58 which may be wound on the bushing 55 and is thus sandwiched between two adjacent stator core elements 52 of the stator sub-assembly. In some embodiments where the stator includes multiple stator sub-assemblies, these multiple stator sub-assemblies may share a common bushing 55. In some other embodiments, each of the multiple stator sub-assemblies may have its own bushing 55 to interface with the shaft 54. FIG. 2B illustrates a cross-sectional view of a part of an exemplary stator 50 to show the relative positions of various components illustrated therein. In some of these embodiments illustrated in FIGS. 2A-E, the stator core element 52 includes a gear-like structural member that includes a stator core element body 64 (see FIG. 4) having multiple protrusions 66 that are substantially evenly distributed along the circumference of the stator core element body 64, where each protrusion 66 extends outwardly along a radial direction.

In some embodiments, a stator core element body 64 may comprise a substantially circular plate having multiple protrusions 66 for accommodating a corresponding stator pole tooth 56. It shall be noted that other geometric forms such as various polygonal shapes may also be devised for the stator core element body 64 in some other embodiments, and that the stator core element body 64 having a substantially circular plate structure illustrated in FIGS. 2A-E shall not be interpreted as limiting the scope of the claims or the scope of other embodiments, unless specifically recited or claimed as such. Each of the multiple stator pole teeth 56 may be integrally formed on a corresponding protrusion 66 (e.g., by machining) in some embodiments or may be separably attached to the corresponding protrusion 66 (e.g., by using fastener(s), welding, brazing, gluing, or any other methods for joining materials). FIG. 2D illustrates a side view of an exemplary protrusion 66 and a stator pole tooth 56 in some embodiments.

FIG. 2D further illustrates the spatial relations between various components in the stator 50 in some embodiments. More specifically, FIG. 2D illustrates two stator sub-assemblies sandwiching a spacer element 60, and each stator sub-assembly includes multiple stator pole teeth 56 and two stator core elements 52 (see e.g., FIGS. 2B, and 4-6) that sandwich the corresponding winding 58 in these embodiments. In some of these embodiments, the spacer element 60 may comprise a substantially circular plate having an aperture to accommodate the shaft 54. In some other embodiments, the spacer element 60 may comprise multiple pieces such as two semi-circular plates or multiple smaller segments of a circular plate.

A segment is a part of a complete circular plate and includes a portion of the circumference of the circular plate less than a semicircle and a chord whose length is shorter than the diameter of the corresponding circular plate. As a result, a segment is smaller than the semi-circular plate. The spacer element 60 may comprise a material having low magnetic permeability or low magnetic permeability constant to reduce electromagnetic interferences between the two stator sub-assemblies in some embodiments. For example, the spacer element 60 may comprise some plastic or ceramic materials have low magnetic permeability to reduce the interferences caused by the respective magnetic field created by each stator sub-assembly and the rotor 30 of an exemplary rotatory device 10. In some embodiments, the spacer element 60 may comprise some light-weight materials such as plastic materials to reduce the total weight of the exemplary rotatory device 10.

Figure 2E:
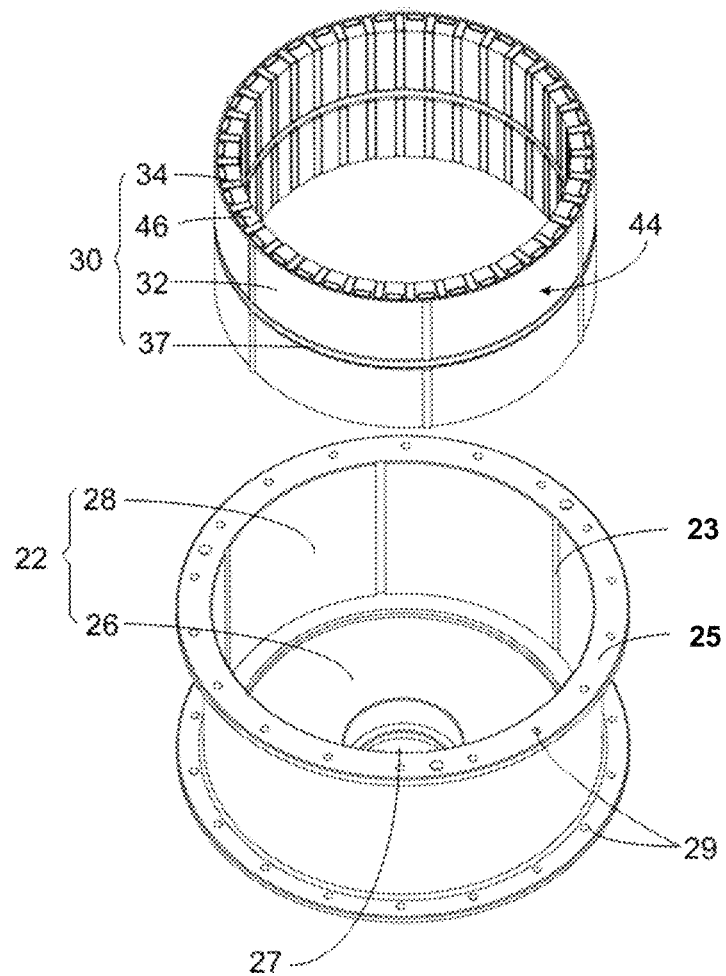

In some embodiments, the spacer element 60 may work in conjunction with a rotor body lamina 36 (see FIGS. 3A-B) to reduce the interferences caused by the respective magnetic fields generated by the stator sub-assemblies and the rotor 30 of an exemplary rotatory device 10. In some embodiments, one or more of the stator core elements 52, the bushing 55, the stator pole teeth 56, or various other parts of the stator 50 may comprise their respective materials having a high magnetic susceptibility or a high magnetic permeability to improve the magnetic field distribution within the exemplary rotatory device. FIG. 2E illustrates more details about a rotor assembly 30 and the housing 20 (see e.g., FIG. 1) of the exemplary rotatory device 10 in some embodiments. More specifically, FIG. 2E illustrates a rotor 30 and a corresponding housing 20 of an exemplary rotatory device 10 in some embodiments.

In some of these embodiments, the rotor 30 may include multiple first magnets 34, multiple magnetic flux retention features or magnetic flux concentrators 46 (collectively "magnetic flux retention feature" hereinafter), a first rotor body 32 having an outer wall 44, and a spacer ring 37 situated between the first rotor body 32 and a second rotor body. More details about the first rotor body 32 will be shown in FIGS. 3A-B. It shall be noted that FIG. 2E shows two rotor bodies and hence two rotor sub-assemblies. Nonetheless, the illustration of two rotor sub-assemblies shall not be interpreted to limit the scope of the present invention. In accordance with various embodiments, the rotor 30 may include only one rotor sub-assembly or more than two rotor sub-assemblies.

In these embodiments illustrated in FIG. 2E, the housing 20 may include a substantially cylindrical housing body 22 comprising a sidewall 28 and a second cover 26. In some of these embodiments, the second cover 26 may comprise a first aperture 27 that may be used to interface with or accommodate the shaft 54. In addition, the sidewall 28 may comprise one or more grooves 23 that correspond to one or more protruded or embossed features 42 on the rotor body lamina 36 (see FIGS. 3A-B) in some embodiments. The one or more grooves 23 and the one or more corresponding protruded or embossed features 42 on the rotor body lamina 36 may be used to ensure that the rotor body or bodies may be separably installed onto the housing 20 in a proper orientation, without affixing the rotor body or bodies onto the housing 20 such that the rotor 30 may be manually disassembled without requiring specific tools or processes.

The housing 20 may also comprise a flange 25 on one or both ends of the sidewall 28 of the substantially cylindrical housing body 22 in some embodiments. A flange 25 may include one or more patterns of apertures 29 that may be used to attach the first cover 24 or the second cover 26 to the housing body 22 in some embodiments. In some other embodiments, at least one of the one or more patterns of apertures 29 may be used to attach the housing 20 and hence the entire rotatory device 10 to another device or apparatus. For example, the exemplary rotatory device 10 may be attached to, for example, a vehicle (e.g., an electric bicycle, an electric car, an electric boat, a hybrid vehicle, etc.) by using at least one of the one or more patterns of apertures 29 to provide electric propulsion to directly drive one or more wheels of the vehicle or to indirectly drive the vehicle or vessel via a transmission box in some embodiments.

For example, the shaft 54 may be attached to the frame of a vehicle, while the housing 20 and hence the motor 10 may be attached to the driving wheel or a transmission mechanism driving the wheels of a vehicle by using at least some of the one or more patterns 29 such that the electric motor 10 may drive the vehicle when the rotor 30 rotates or spins. It shall be noted that the rotatory device 10 may also be attached to other applications in other manners, and that the one or more patterns 29 are thus not intended to limit the scope of such other manners of attaching the rotatory device 10 to another application. The stator pole teeth 56 are attached to or formed on the corresponding protrusions 66 of a stator core element 52 in such a way that the stator pole teeth 56 are pointing towards each other (although offset angularly) in the two stator core elements 52 of a stator sub-assembly and thus further reduce the gaps between the two stator core elements 52 in the stator sub-assembly.

In some of the embodiments illustrated in FIG. 2D, the two stator core elements 52 in a stator sub-assembly may be offset angularly or circumferentially shifted about the center axis of the shaft 54 from each other such that two closest stator pole teeth 56 on two separate stator core elements 52 of a stator sub-assembly are circumferentially offset by a certain mechanical angle corresponding to a predetermined electrical angle (e.g., 90 degrees electrical angle) between two immediately neighboring stator pole teeth 56 so as to reduce torque ripples or cogging torque. In some embodiments, a first stator core element 52 in a first stator sub-assembly may also be circumferentially offset by the same electrical angle in the same angular direction from the immediately neighboring stator core element 52 in an immediately neighboring stator sub-assembly.

Figure 4:
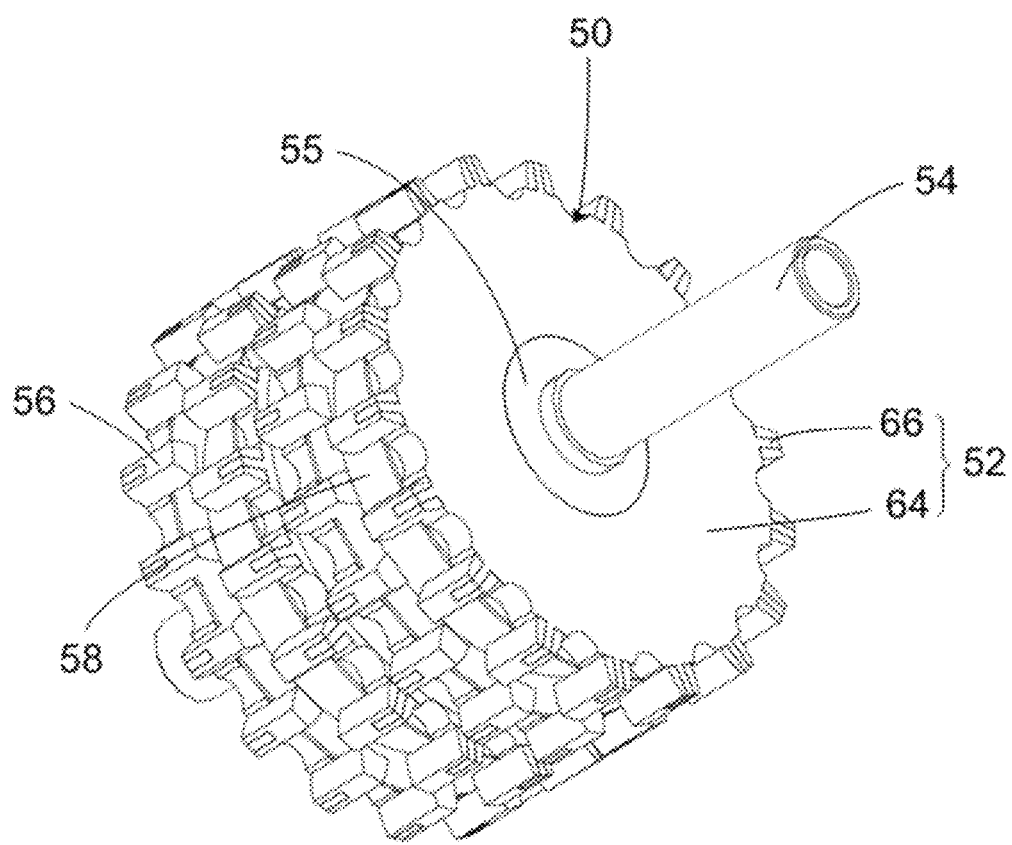
FIG. 4 illustrates a perspective view of an exemplary, assembled stator 50 in some embodiments.

In some embodiments, two immediately neighboring stator core elements 52 in the same stator sub-assembly or in two different stator sub-assemblies may be circumferentially or angularly offset by the same electrical angle or by different angles in various embodiments. The mechanical angle corresponding to an electrical angle may be determined based on the number of poles in a stator sub-assembly. In some of the embodiments illustrated in FIG. 2D, two stator pole teeth 56 on two stator core elements 52 may be circumferentially offset by 90 electrical degrees such that the center line of a stator core tooth 56 in a first stator core element 52 may be located substantially along the midline that dividing the distance between two neighboring stator pole teeth 56 in a second stator core element 52 of the same stator sub-assembly. For example, the embodiments illustrated in FIGS. 2A and 4 where a stator sub-assembly includes 18 pairs of stator pole teeth 56, the first plurality of stator pole teeth may be circumferentially offset from the second plurality of stator pole teeth by a mechanical angle of 5 degrees if the first plurality of stator pole teeth are offset by an electrical angle of 90 degrees. In some other embodiments, a stator sub-assembly may include more than or fewer than 18 pairs of stator pole teeth as illustrated in FIGS. 2A and 4, and thus the offset in terms of mechanical angles may vary accordingly. It shall be noted that the number of pairs of stator pole teeth and hence the number of poles in a stator sub-assembly matches that of the corresponding poles in the rotor in some embodiments. In some embodiments, the two sets of stator pole teeth of two immediately neighboring stator sub-assemblies may also be offset by an electrical angle of 90 degrees. In these embodiments, these two sets of stator pole teeth of two immediately neighboring stator sub-assemblies may also be offset by the same mechanical angle as the first and second plurality of stator pole teeth in the same stator sub-assembly.

FIGS. 3A-B illustrate more details about the rotor 30 of the exemplary rotatory device 10 illustrated in FIGS. 1 and 2A-E in some embodiments. More specifically, FIGS. 3A-B illustrate more details about the spatial relations between the rotor body 32 and some additional components of a rotor sub-assembly in these embodiments. It shall be noted that a rotor body 32 may include a single piece part manufactured by, for example but not limited to, one or more machining processes from a piece of raw material, a casting process using a mold, or a sintering process or a powder metallurgy process in some embodiments or may include multiple laminas 36 stacking on top of each other to form a unitary rotor body 32 in some other embodiments.

One of the advantages of using the sintering process or the powder metallurgy process in manufacturing various components described herein is that the raw material may be more evenly blended before the sintering or powder metallurgy process, and thus the material properties (e.g., magnetic permeability, magnetic susceptibility, etc.) of the components as manufactured may be more uniform. In those embodiments where the rotor body 32 comprise a single piece part manufactured by, for example but not limited to, one or more machining processes from a piece of raw material, a casting process using a mold, or a sintering process or a powder metallurgy process, the rotor body 32 is identical to the rotor body lamina 36.

In those embodiments where the rotor body 32 includes multiple rotor body laminas 36 laminated together to form the unitary rotor body 32, a rotor body lamina 36 constitutes a layer or a smaller portion of the rotor body 32 and works in conjunction with the remaining rotor body laminas 36 to jointly define various features illustrated in FIGS. 3A-B. FIGS. 3A-B illustrate a segment of a rotor body lamina 36 that includes multiple magnetic flux retention features 40, one or more protruded or embossed features 42 (only one protruded or embossed feature is shown in FIGS. 3A-B), and a substantially cylindrical sidewall 44.

In some embodiments where the rotor body 32 includes multiple rotor body laminas 36, each rotor body lamina 36 includes identically designed features 48, 47, 40, and 38. These multiple rotor body laminas 36 are then aligned and assembled to form the unitary rotor body 32 such that multiple identical features of these multiple rotor body laminas 36 jointly form a single feature on the unitary rotor body 32. For example, a rotor body 32 may include multiple rotor body laminas 36, each of which includes a substantially cylindrical sidewall portion 38. These multiple rotor body laminas 36 may be aligned and stacked on top of each other such that each of the substantially cylindrical sidewall portion 38 on each rotor body lamina 36 is aligned with the other corresponding substantially cylindrical sidewall portions 38 on the remaining rotor body laminas 36 in the stack to jointly form a substantially cylindrical sidewall portion 44 for the unitary rotor body 32.

As another example where a rotor body 32 may include multiple rotor body laminas 36, each of which includes one or more protruded or embossed features 41, the multiple rotor body laminas 36 may be aligned and stacked in a way that each protruded or embossed feature 41 on a rotor body lamina 36 is aligned with the remaining corresponding protruded or embossed features 41 of the remaining rotor body laminas 36 to jointly form a protruded or embossed feature 42 for the unitary rotor body 32 in some embodiments.

As another example where a rotor body 32 may include multiple rotor body laminas 36, each of which includes multiple first magnet retention features 49, the multiple rotor body laminas 36 may be aligned and stacked in a way that each first magnet retention feature 49 on one rotor body lamina 36 may be aligned with the remaining, corresponding first magnet retention features 49 of the remaining rotor body laminas 36 in such a way that these first magnet retention features 49 of the multiple rotor body laminas 36 jointly form a unitary second magnet retention feature 47 to receive a second magnet 45 for the rotor body 36. A magnetic flux retention feature 40 and a second magnet 45 accommodated therein constitutes a pole for the electric motor.

As another example where a rotor body 32 may include multiple rotor body laminas 36, each of which includes multiple magnetic flux retention features 46, the multiple rotor body laminas 36 may be aligned and stacked in a way that each magnetic flux retention feature 46 may be aligned with the remaining, corresponding magnetic flux retention features 46 of the remaining rotor body laminas 36 in the stack such that these magnetic flux retention features 46 jointly form a unitary magnetic flux retention feature 40 for the rotor body 32. In some embodiments where a rotor body 32 constitutes a single piece part, the rotor body 32 is the rotor body lamina 36. In these embodiments, the substantially cylindrical sidewall portion 38 of the single rotor body lamina 36 constitutes the substantially cylindrical sidewall portion 44 for the rotor body 32. The same also applies to features 47 and 49, 46 and 40, and 41 and 42 in these embodiments.

The protruded or embossed feature 42 appears to comprise a semi-circular profile in FIGS. 3A-B. Nonetheless, it shall be noted that the profile of the one or more protruded or embossed features 42 are not so limited and may thus include other profiles in other embodiments. A rotor ring lamina 36 may further include a second magnet retention feature 47 disposed on the corresponding magnetic flux retention feature 40 and a first magnet retention feature 48 between two adjacent magnetic flux retention features 40 in some embodiments. In the illustrated embodiments, the second magnet retention feature 47 includes a quadrilateral cutout to receive a second magnet 45 having a direction of its magnetic moment substantially along the radial direction of the rotor body 32.

In the example illustrated in FIG. 3A, the second magnet 45 has a north pole near and a south pole away from the center of the rotor body 32. In addition, the first magnet retention feature 48 includes an open slot to accommodate a first magnet 34 having the direction of its magnetic moment substantially along the circumferential direction of the rotor body 32. In these illustrated embodiments, two adjacent first magnets 34 exhibit opposite directions of magnetic moment. For example, a first magnet 34 has a south pole on its right side, whereas the adjacent first magnet 34-1 has a south pole on its left-hand side. In some of these embodiments, two adjacent first magnets 34 are placed in their respective first magnet retention feature 48 such that like poles of these two adjacent first magnets 34 are closer to each other.

For example, the north poles of the two adjacent first magnets 34 are placed closer to each other in FIG. 3A in the illustrated embodiments. In these embodiments, the magnetic flux retention feature 46 between these two first magnets 34 may be used to better retain or confine the magnetic fluxes created by these two first magnets 34. In these embodiments, the second magnets 45 comprise a direction of their respective magnetic moment substantially along the radial direction of the rotor body 52. In addition, the pole of a second magnet 45 near the center of the rotor body 52 is the same as the poles of the two neighboring first magnets facing each other. For example, in some of the embodiments illustrated in FIG. 3A, the second magnet 45 between the first magnets 34 and 34-1 has a direction of its magnetic moment substantially along the radial direction of the rotor body and a north pole on its side near the center of the rotor body 52 to further enhance the magnetic flux densities in the magnetic flux retention feature 40 between the two neighboring first magnets 34 and 34-1. In these embodiments, the magnetic flux retention features 40 comprise a material having a high magnetic permeability or a high magnetic susceptibility.

In some of these embodiments, the magnetic flux retention features 40 may comprise a diamagnetic material. Each of the first magnets 34 or 34-1 is retained in its corresponding first magnet retention feature 48, wherein a first magnet is removed in FIGS. 3A-B for clarity. It shall be noted that the profile of the first or the second magnet retention feature may be determined based at least in part upon the geometric characteristics of the corresponding magnet or ease or cost of manufacturing in some embodiments. In some embodiments, the rotor body 32 of a rotor subassembly may contain a single piece component that includes the multiple magnetic flux retention features 40, one or more protruded or embossed features 42, and a substantially cylindrical sidewall 44.

Figure 6:
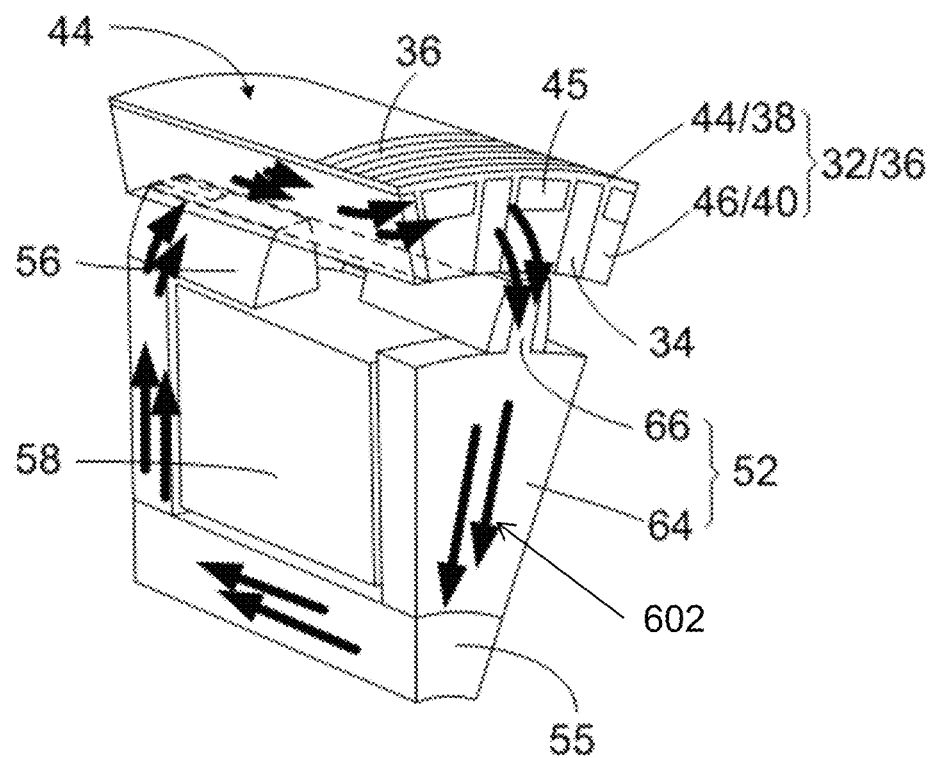
FIG. 6 illustrates a perspective view of a circular sector of an exemplary rotor and stator in an exemplary transverse flux motor in some embodiments.

In some of these embodiments, a protruded or embossed feature 42 mating with the corresponding groove 23 may extend through substantially the entire height of the rotor body 32. In some other embodiments of these illustrated embodiments, a protruded or embossed feature 42 may extend through only a smaller portion of the height of the rotor body 32 so long as the protruded or embossed feature 42 serves the positioning function for the rotor body 32 with respect to the housing body 22. In some other embodiments illustrated in FIGS. 3A-B, a rotor body 32 may comprise multiple identical or substantially identical laminas as illustrated in FIG. 6 described below. In these embodiments, each lamina includes identically designed features described herein (e.g., reference numerals 40, 44, 47, 48, etc.) such that these laminas, when stacked on top of each other, form a rotor body 32 having specific unitary features, each of which includes multiple sub-features from the stacked laminas.

For example, each lamina may include an identical second magnet retention feature 47 as designed (although not necessarily identical as manufactured) such that multiple laminas, when stacked on top of each other, include a unitary second magnet retention feature 47 for receiving a first magnet having a length exceeding the thickness of an individual lamina. It shall be noted that all of the laminas jointly forming a rotor body 32 may have the same nominal thickness in some embodiments or may have two or more different nominal thicknesses in some other embodiments.

It shall also be noted that these multiple laminas may be substantially identical but may not be entirely identical to each other in that, other than manufacturing tolerances or slacks or deviations caused by handling or operating conditions, some of these multiple laminas may include one or more positioning or locking features for stacking these laminas that other laminas (e.g., laminas at both ends) in the stack do not have, although all of these laminas have the same functional features as described above. Therefore, one of ordinary skill in the art will appreciate that these multiple laminas are substantially identical despite the presence of these different features in some but not all of the laminas because these different features do not affect the functions of these laminas.

FIG. 3B illustrates a perspective view of a segment of a rotor ring lamina 36 that includes one or more protruded or embossed features 42, multiple magnetic flux retention features 40, multiple sidewall portions 44 separated by one or more protruded or embossed features 42, multiple second magnets 45 in their respective second magnet retention features 47, multiple first magnets 34 in their respective first magnet retention feature 48 in the illustrated embodiments. In some of these embodiments, two adjacent first magnets (e.g., 34 and 34-1) and the second magnet (e.g., 45) form a substantial U-shape having the polarities as described herein, although the three magnets are not physically connected to each other, and the two first magnets may or may not necessarily be parallel to each other. In some embodiments, at least some of the first magnets 34 and the second magnets 45 may include permanent magnets that may be made of materials such as neodymium-iron-boron (NdFeB) or samarium-cobalt ($SmCo_5$).

FIG. 4 illustrates a perspective view of an exemplary, assembled stator 50 in some embodiments. In these embodiments, the stator 50 includes two rotor sub-assemblies. Each stator sub-assembly includes two identical stator core elements 52 sandwiching a field winding 58. Each stator core element 52 includes a stator core element body 64 and multiple protrusions 66 upon which the corresponding stator pole teeth 56 may be installed. The stator 50 may further include one or more bushings 55 to accommodate the shaft 54 in some embodiments. A side view of a portion of the stator 50 is provided in FIG. 2D which further shows that the stator 50 may further include one or more spacer elements 60 in between two adjacent stator sub-assemblies in some embodiments. Each of the protrusions 66 may receive a corresponding stator pole tooth 56 that may be integrally formed on the corresponding protrusion 66 (e.g., by machining) in some embodiments or may be separably attached to the corresponding protrusion 66 (e.g., by using fastener(s), welding, brazing, gluing, or any other methods for joining materials) as previously described.

Figure 5:
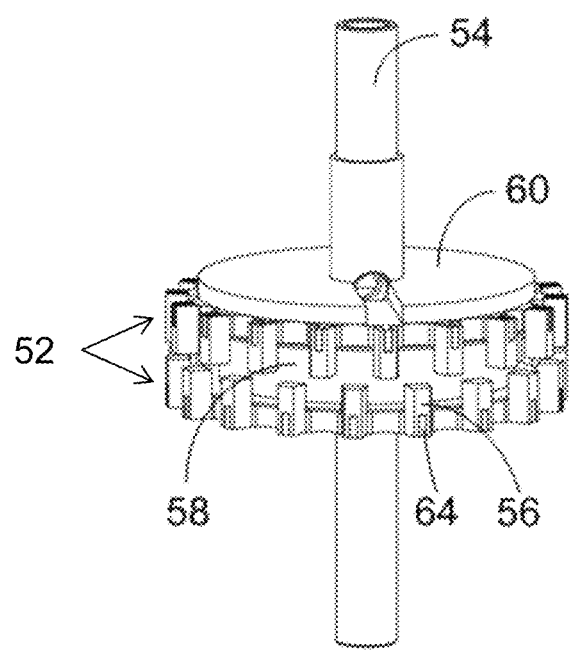
FIG. 5 illustrates an exemplary stator 50 in some embodiments.

FIG. 5 illustrates an exemplary stator 50 in some embodiments. More specifically, FIG. 5 illustrates only one stator sub-assembly while removing another stator sub-assembly to clearly show the two spacer elements 60 between two adjacent stator sub-assemblies. FIG. 5 further illustrates that the spacer elements 60 includes two segments of a complete circular plate and are sandwiched between the stator sub-assembly below the spacer elements 60 and another stator sub-assembly (not shown for clarity) above the spacer elements 60 in some of these embodiments. Each spacer element 60 includes a feature (e.g., an aperture) to accommodate the shaft 54.

In the illustrated embodiments, the spacer element 60 may comprise a material having low magnetic permeability or low magnetic permeability constant to reduce electromagnetic interferences between the two stator sub-assemblies in some embodiments. For example, the spacer element 60 may comprise some plastic or ceramic materials have low magnetic permeability to reduce the interferences caused by the respective magnetic field created by each stator sub-assembly and the rotor 30 of an exemplary rotatory device 10. In some embodiments, the spacer element 60 may comprise some light-weight materials such as plastic materials to reduce the total weight of the exemplary rotatory device. FIG. 5 further illustrates that each stator sub-assembly includes two stator core elements 52 sandwiching a winding 58 and attached to the shaft 54 by using, for example, a bushing (e.g., reference numeral 55 in FIG. 4). Each stator core element 52 includes a substantially circular plate and multiple protrusions 66 that are substantially evenly distributed along the circumference of the substantially circular plate of the stator core element 52 in some embodiments. It is envisioned that stator core elements 52 may also have geometric shapes other than a substantially circular plate in other embodiments. Each protrusion 66 may extend outwardly along a radial direction from the center of the stator core element 52 and may be configured to receive its corresponding stator pole tooth 56 as previously described with respect to FIGS. 2A-E.

FIG. 6 illustrates a perspective view of a circular sector of an exemplary rotor and stator in an exemplary transverse flux motor in some embodiments. A circular sector or a sector is a portion of a circular shape enclosed by two radii and an arc of the circular shape. More specifically, FIG. 6 shows a sector of an exemplary rotor including a unitary rotor body 32 having multiple rotor body laminas 36, multiple second magnets 45 in their respective first magnet detention features, multiple first magnets 34 in their respective second magnet detention features, and a sidewall portion 44 jointly formed by the multiple sidewall portions 38 of the multiple rotor body laminas 36. The magnetic flux retention features 46 of the multiple rotor body laminas 36 jointly form a corresponding magnetic flux retention feature 40 of the unitary rotor body 32 in these embodiments.

The sector view of the stator illustrates a sector view of two stator core elements 52, each of which further includes a stator core element body 64 and a protrusion 66 for receiving its corresponding stator pole tooth 56. The two stator core elements 52 are further interfaced with a bushing 55 to be attached to a shaft (not shown in FIG. 6). The two sectors of the stator core elements 52 sandwich a field winding 58 which may be wound on, for example, the bushing 55 in some embodiments. FIG. 6 further illustrates some imaginary arrowheads that jointly and schematically show the magnetic field lines between the stator and the rotor in these embodiments.

As it may be seen from FIG. 6, at least some of the bushing 55, the stator core elements 52, the stator pole teeth 56, and the rotor body laminas 36 may comprise one or more materials having some predetermined magnetic susceptibility or magnetic permeability that may be determined based at least in part upon the operational requirements (e.g., speed(s) or torque(s) of the transverse flux motor or the electric current(s) or voltage(s) for the transverse flux motor, etc.). During operation of the motor, the magnetic flux in or around a first magnetic flux retention feature 46 passes through the first gap between the rotor and the stator, enters a corresponding first stator pole tooth 56, then passes through the first magnetically permeable stator core element body 64, the bushing 55, and a neighboring second magnetically permeable stator core element body 64 of the same stator sub-assembly, passes through the second circumferentially offset stator pole tooth 56 and a second gap between the stator and the rotor, and then enters a neighboring second magnetic flux retention feature 46.

The magnetic flux further passes through a first magnet 34 between the first and second magnetic flux retention features 46 and returns to the first magnetic flux retention feature 46 to complete the loop 602 due to the opposite polarities of the first and the second magnetic flux retention features 46 in this example. In this example, the rotor 30 rotates or spins by the attractive force from stator 50. Moreover, when a first magnetic retention feature 46 is substantially aligned with the axial direction of the shaft 54 with a corresponding stator pole tooth 56, the electrical current in the field windings or the field coil 58 changes direction to repulse the first magnetic retention feature 46 and further to attract the immediately neighboring second magnetic retention feature 46 in the direction of rotation or spinning so as to maintain the rotation or spinning of the electric motor in this example.

With the exemplary arrangements described herein, the electromagnetic force vector is perpendicular to the magnetic flux lines, rather than parallel to the magnetic flux lines. In addition, the stator windings (e.g., the field coil or field windings 58) carry electric current in the circumferential direction and produce a homopolar magnetic motive force that interacts with the heteropolar magnetomotive force generated by the rotor excitation by the rotor magnets and may be regulated by the stator poles (e.g., the magnetic flux retention features 46 with their corresponding second magnets 45). In some embodiments, one of the advantages of various embodiments is that a change (e.g., an increase or a decrease) in the number of poles does not change the magnetomotive force per pole.

Another advantage of various embodiments is that the magnetic flux distribution or the field coils or filed windings may be varied without compromising the dimensions of either and thus provide greater freedom in devising specific electric motor configurations. In some embodiments where a rotor includes multiple laminas 36, at least some of these multiple laminas 36 may comprise soft magnetic materials, soft magnetic composite materials, or combinations thereof. In some other embodiments where a rotor includes multiple laminas 36, at least some of these multiple laminas 36 may comprise hard magnetic materials, hard magnetic composite materials, or combinations thereof. In some other embodiments where a rotor includes multiple laminas 36, at least some of these multiple laminas 36 may comprise both soft and hard magnetic materials, both soft magnetic composite materials and hard magnetic composite materials, or combinations thereof.

Figure 7:
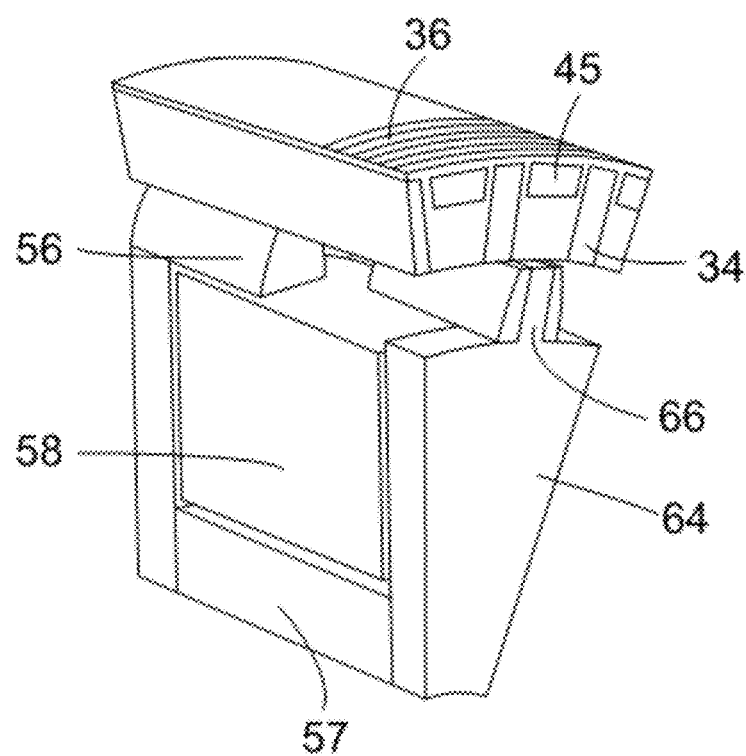
FIG. 7 illustrates a perspective view of a circular sector of an exemplary rotor and stator in an exemplary transverse flux motor in some embodiments.

FIG. 7 illustrates a perspective view of a circular sector of an exemplary rotor and stator in an exemplary transverse flux motor in some embodiments. The exemplary rotor and stator illustrated in FIG. 7 are similar to those in FIG. 6 except for that the stator core element bodies 64 in FIG. 7 may be directly attached to the shaft 54 without any intervening parts, and that the two stator core element bodies 64 may be separated by a sleeve 57 that is also attached to the shaft 54.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:
1. A rotatory device, comprising:
 a housing;
 a stator comprising a first stator sub-assembly including:
  a first stator core element having a first plurality of stator pole teeth; and
  a second stator core element adjacent to the first stator core element in an axial direction and having a second plurality of stator pole teeth circumferentially offset from the first plurality of stator pole teeth; and a rotor surrounding the stator and comprising:
   a rotor body attached to an interior wall of the housing, including a plurality of rotor body laminas laminated along a axial direction, and having a plurality of magnetic flux retention features extending radially toward the stator; and
   a plurality of first permanent magnets disposed between adjacent pairs of the plurality of magnetic flux retention features of the rotor body;
   a plurality of second permanent magnets embedded in the rotor body, wherein the number of the second permanent magnets is equal to that of the magnetic flux retention features, there is one of the second permanent magnets arranged between each two adjacent first permanent magnets wherein: the rotor body further includes a plurality of apertures defined in the plurality of magnetic flux retention features, and respectively adjacent to the ends of the magnetic flux retention features away from the stator; and the second magnets are disposed in the plurality of apertures in the rotor body, wherein: the plurality of first magnets have first orientation of magnetic moments substantially tangential to circumferential directions of the rotor body; and the plurality of second magnets have second orientation of magnetic moments substantially aligned in radial directions of the rotor body.

2. The rotatory device of claim 1, wherein:
the housing further comprises a first positioning feature on the interior wall, and
the rotor body further comprises a second positioning feature that mates with the first positioning feature.

3. The rotatory device of claim 1, wherein:
the first stator core element further comprises a plurality of protrusions; and
the plurality of first stator pole teeth of the first stator core element are disposed on the plurality of protrusions.

4. The rotatory device of claim 1, wherein:
the housing further comprises a first mounting pattern to attach the housing to a moving part of an external device; and
the stator further comprises a shaft to attach the stator to an immobile part of the external device.

5. The rotatory device of claim 1, the first stator sub-assembly further comprising a first field winding disposed between the first stator core element and the second stator core element.

6. The rotatory device of claim 1, the stator further comprising a second stator sub-assembly adjacent to the first stator sub-assembly in a axial direction and including:
   a third stator core element having a third plurality of stator pole teeth offset circumferentially from the second plurality of stator pole teeth; and
   a fourth stator core element having a fourth plurality of stator pole teeth circumferentially offset from the third plurality of stator pole teeth.

7. The rotatory device of claim 6, the stator further comprising a spacer element disposed between the first stator sub-assembly and the second stator sub-assembly.

8. The rotatory device of claim 1, wherein:
a pair of the plurality of first magnets adjacent to each other have a same magnetic pole facing each other; and
one the plurality of second magnets adjacent to the pair of the plurality of the first magnets has a magnetic pole facing the pair of first magnets identical to the same magnetic pole of the pair of the first magnets facing each other.

9. A transverse flux motor, comprising:
a housing;
a stator, comprising:
   a shaft; and
   a first stator sub-assembly attached to said shaft and having a first plurality of stator pole teeth arranged in a first circle and a second plurality of stator pole teeth arrange in a second circle and circumferentially offset from the first plurality of stator pole teeth; and
a rotor surrounding said stator and comprising:
   a rotor body attached to an interior wall of said housing and having a plurality of magnetic flux retention features extending radially toward said stator and a plurality of apertures on the plurality of magnetic flux retention features adjacent to said housing;
   a plurality of first permanent magnets disposed between adjacent pairs of the plurality of magnetic flux retention features of said rotor body; and
   a plurality of second permanent magnets disposed in the plurality of apertures in said rotor body, the first permanent magnets and the second permanent magnets alternatively arranged along a circumferential direction of the rotor wherein: the plurality of first magnets have first orientation of magnetic moments substantially tangential to circumferential directions of the rotor body; and the plurality of second magnets have second orientation of magnetic moments substantially aligned in radial directions of the rotor body.

10. The transverse flux motor of claim 9, wherein:
said first stator sub-assembly further comprises a plurality of first protrusions and a plurality of second protrusions; and
the plurality of first stator pole teeth and the plurality of the second stator pole teeth are disposed on the plurality of first protrusions and the plurality of second protrusions, respectively.

11. The transverse flux motor of claim 9, wherein said first stator sub-assembly further comprises a first field winding disposed between the first circle of the plurality of the first stator pole teeth and the second circle of the plurality of the second stator pole teeth.

12. The transverse flux motor of claim 9, said stator further comprising a second stator sub-assembly adjacent to said first stator sub-assembly in an axial direction and including:
   a third plurality of stator pole teeth arranged in a third circle parallel to the second circle and offset circumferentially from the second plurality of stator pole teeth; and
   a fourth plurality of stator pole teeth circumferentially arranged in a fourth circle adjacent to the third circle and offset circumferentially from the third plurality of stator pole teeth.

13. The transverse flux motor of claim 12, said stator further comprising a spacer disposed between said first stator sub-assembly and said second stator sub-assembly.

14. The transverse flux motor of claim 12, wherein:
the second plurality of stator pole teeth are offset from the first plurality of stator pole teeth in a predetermined circumferential direction by a predetermined angle on said first stator sub-assembly; and
the fourth plurality of stator pole teeth are offset from the third plurality of stator pole teeth in the predetermined circumferential direction by the predetermined angle on said second stator sub-assembly.

15. The transverse flux motor of claim 14, wherein the third plurality of stator pole teeth on said second stator sub-assembly are offset from the second plurality of stator pole teeth on said first stator sub-assembly in the predetermined circumferential direction by the predetermined angle.

16. The transverse flux motor of claim 9, wherein said rotor body includes a plurality of rotor body laminas laminated together along an axial direction of said rotor.

17. The transverse flux motor of claim 9, wherein: a pair of said plurality of first magnets adjacent each other have identical magnetic poles facing each other; and one of said plurality of second magnets adjacent the pair of said plurality of first magnets has a magnetic pole facing the pair of first magnets identical to the identical magnetic poles of the pair of first magnets facing each other.

* * * * *